United States Patent
Li et al.

(10) Patent No.: US 11,024,048 B2
(45) Date of Patent: Jun. 1, 2021

(54) METHOD, IMAGE PROCESSING DEVICE, AND SYSTEM FOR GENERATING DISPARITY MAP

(71) Applicant: Wistron Corporation, New Taipei (TW)

(72) Inventors: Chong-Wei Li, New Taipei (TW); Ming-Che Ho, New Taipei (TW)

(73) Assignee: Wistron Corporation, New Taipei (TW)

(*) Notice: Subject to any disclaimer, the term of this patent is extended or adjusted under 35 U.S.C. 154(b) by 102 days.

(21) Appl. No.: 16/027,268

(22) Filed: Jul. 4, 2018

(65) Prior Publication Data
US 2019/0213749 A1    Jul. 11, 2019

(30) Foreign Application Priority Data
Jan. 9, 2018 (TW) .................................. 107100837

(51) Int. Cl.
| | |
|---|---|
| G06T 7/593 | (2017.01) |
| H04N 5/247 | (2006.01) |
| G06K 9/62 | (2006.01) |
| G06T 3/40 | (2006.01) |

(52) U.S. Cl.
CPC ............ *G06T 7/593* (2017.01); *G06K 9/6202* (2013.01); *G06K 9/6215* (2013.01); *G06T 3/40* (2013.01); *H04N 5/247* (2013.01)

(58) Field of Classification Search
USPC ....................................................... 348/135
See application file for complete search history.

(56) References Cited

U.S. PATENT DOCUMENTS

| | | | | |
|---|---|---|---|---|
| 2013/0071009 | A1* | 3/2013 | Ha | G06T 7/593 382/154 |
| 2016/0275691 | A1* | 9/2016 | Domanski | G06T 7/60 |
| 2017/0163960 | A1* | 6/2017 | Nagata | H04N 13/128 |
| 2018/0189979 | A1* | 7/2018 | Lin | G06T 7/593 |

(Continued)

FOREIGN PATENT DOCUMENTS

| | | |
|---|---|---|
| CN | 103177451 | 6/2013 |
| CN | 103327346 | 4/2015 |
| JP | 2001319229 | 11/2001 |

(Continued)

OTHER PUBLICATIONS

Machine translation of JP 2012133408 A (Year: 2012).*

(Continued)

*Primary Examiner* — Christopher S Kelley
*Assistant Examiner* — Ana Picon-Feliciano
(74) *Attorney, Agent, or Firm* — JCIPRNET

(57) ABSTRACT

A method, an image processing device, and a system for generating a disparity map are proposed. The method includes the following steps. Images of a specific scene are captured by two image sensors to generate two original images. A shrinking process is performed on the two original images to generate two shrunk images. A shrunk disparity map is generated by using the two shrunk images. A magnifying process is performed on the shrunk disparity map to generate a magnified disparity map. Whether each magnified disparity value of the magnified disparity map is reliable is determined so as to accordingly generate a refined disparity map.

19 Claims, 8 Drawing Sheets

(56) References Cited

U.S. PATENT DOCUMENTS

2019/0014303 A1* 1/2019 Zhu ..................... H04N 13/271
2019/0349572 A1* 11/2019 Uemori ................ G06K 9/6267

FOREIGN PATENT DOCUMENTS

| | | | |
|---|---|---|---|
| JP | 2001319229 A | * | 11/2001 |
| JP | 2012133408 | | 7/2012 |
| JP | 2012133408 A | * | 7/2012 |
| WO | 2011163603 | | 12/2011 |

OTHER PUBLICATIONS

Machine translation of JP 2001319229 A (Year: 2001).*
"Office Action of Japan Counterpart Application," dated Oct. 29, 2019, p. 1-p. 3.
"Office Action of India Counterpart Application", dated Jul. 10, 2020, p. 1-p. 7.

* cited by examiner

METHOD, IMAGE PROCESSING DEVICE, AND SYSTEM FOR GENERATING DISPARITY MAP

CROSS-REFERENCE TO RELATED APPLICATION

This application claims the priority benefit of Taiwan application serial no. 107100837, filed on Jan. 9, 2018. The entirety of the above-mentioned patent application is hereby incorporated by reference herein and made a part of this specification.

TECHNICAL FIELD

The disclosure relates to an image processing method, an image processing device and a system thereof, and more particularly, to a method, an image processing device and a system for generating a disparity map.

BACKGROUND

Through the development of frameworks in image processing, stereo vision has been extensively applied in many fields such as structured light, stereo image, distance detection, surveillance, and so forth. Stereo vision generally includes two stages. In the first stage, depth information would be generated by using a depth camera, a stereo camera, or a related algorithm. In the second stage, a stereo image would be generated by using the depth information. Hence, accurate depth information is rigidly important to provide a pleasant stereo viewing experience.

The fundamental of depth computation in stereo vision is to search for a same object from left and right images and determine an object distance on a basis of offsets of the object appearing in the two images (i.e. disparity). Images with higher resolution could result in a high accuracy level of disparity estimation, that is, more accurate object distance estimation. Nonetheless, computation and time complexity would be inevitably increased.

SUMMARY OF THE DISCLOSURE

The disclosure is directed to a method, an image processing device and a system for generating a disparity map.

In an embodiment of the disclosure, the method is applicable to a system having a first image sensor and a second image sensor, and includes the following steps. Images of a specific scene are captured by using the first image sensor and the second image sensor to respectively generate a first original image and a second original image. A shrinking process is performed on the first original image and the second original image to respectively generate a first shrunk image and a second shrunk image. A shrunk disparity map is generated by using the first shrunk image and the second shrunk image, where the shrunk disparity map includes shrunk disparity values. A magnifying process is performed on the shrunk disparity map to generate a magnified disparity map having magnified disparity pixels. A refined disparity map of the first original image and the second original image is generated according to a reliability of each of the magnified disparity values.

In an embodiment of the disclosure, the system includes a first image sensor, a second image sensor, a memory, and a processor, where the processor is connected to the first image sensor, the second image sensor, and the memory. The first image sensor and a second image sensor are configured to capture images. The memory is configured to store data. The processor is configured to execute steps of: capturing images of a specific scene by using the first image sensor and the second image sensor to respectively generate a first original image and a second original image; performing a shrinking process on the first original image and the second original image to respectively generate the first shrunk image and the second shrunk image; generating a shrunk disparity map by using the first shrunk image and the second shrunk image, wherein the shrunk disparity map includes shrunk disparity values; performing a magnifying process on the shrunk disparity map to generate a magnified disparity map having magnified disparity pixels; and generating a refined disparity map of the first original image and the second original image according to a reliability of each of the magnified disparity values.

In an embodiment of the disclosure, the image processing device includes a memory, a communication interface, and a processor, where the processor is connected to the memory and the communication interface. The memory is configured to store data. The communication interface is configured to connect the image processing device to a first image sensor and a second image sensor. The processor is configured to execute steps of: obtaining a first original image and a second original image respectively captured from a specific scene from the first image sensor and the second image sensor; performing a shrinking process on the first original image and the second original image to respectively generate the first shrunk image and the second shrunk image; generating a shrunk disparity map by using the first shrunk image and the second shrunk image, where the shrunk disparity map includes shrunk disparity values; performing a magnifying process on the shrunk disparity map to generate a magnified disparity map having magnified disparity pixels; and generating a refined disparity map of the first original image and the second original image according to a reliability of each of the magnified disparity values.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
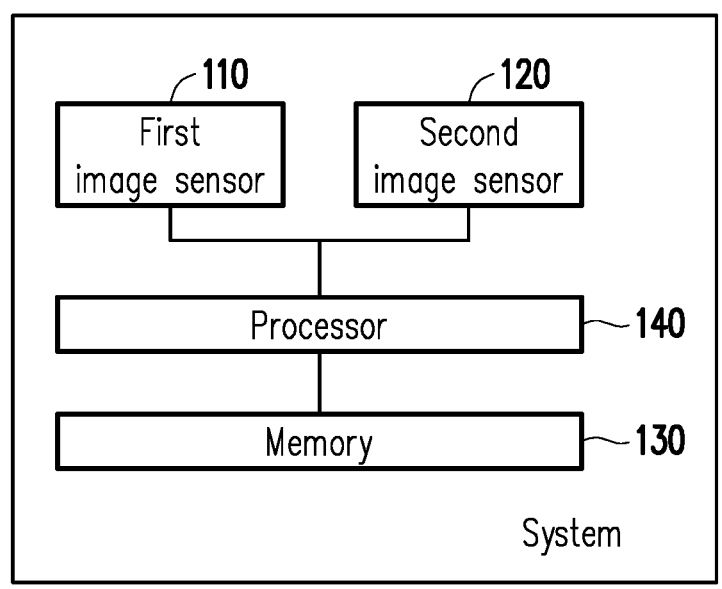
FIG. 1 is a block diagram illustrating a system for generating depth information according to an embodiment of the disclosure.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a block diagram illustrating a proposed system for generating depth information according to an embodiment of the disclosure. It should, however, be noted that this is merely an illustrative example and the disclosure is not limited in this regard. All components of the system and their configurations are first introduced in FIG. 1. The functionalities of the components are disclosed in more detail in conjunction with FIG. 2.

With reference to FIG. 1, a system 100 would include a first image sensor 110, a second image sensor 120, a memory 130, and a processor 140. In the present embodiment, the system 100 may be an all-in-one image capturing device that integrates the first image sensor 110, the second image sensor 120, the memory 130, and the processor 140, such as a digital camera, a SLR camera, a digital video camera, a smart phone or a tablet computer with dual lens.

In the present embodiment, each of the first image sensor 110 and the second image sensor 120 would be a camera lens having an optical lens and sensing elements. The sensing element is configured to sense light intensity entering the optical lens to thereby generate images. The sensing elements may be, for example, charge coupled device (CCD) elements, complementary metal-oxide semiconductor (CMOS) elements or the like. Images captured by the lenses would be imaged to the sensing elements, converted into digital signals, and outputted to the processor 140.

The memory 130 is configured to store data such as images and programming codes and may one or a combination of a stationary or mobile random access memory (RAM), a read-only memory (ROM), a flash memory, a hard drive, other similar devices or integrated circuits.

The processor 140 would be configured to control operations among the components in the system 100 and may be, for example, a central processing unit (CPU), a graphic processing unit (GPU) or other programmable devices for general purpose or special purpose such as a microprocessor and a digital signal processor (DSP), a programmable controller, an application specific integrated circuit (ASIC), a programmable logic device (PLD), other similar devices, a combination of above-mentioned devices or integrated circuits.

It should be noted that, in another embodiment, the memory 130 and the processor 140 may be included in an electronic device having image processing functions (e.g., a personal computer, a notebook computer, a smart phones, a tablet computer, etc.), and such electronic device may receive images of a specific scene captured from different angles by the first image sensor 110 and the second image sensor 120 via a communication interface (not shown) in a wired or wireless manner to generate a disparity map. In the present embodiment, the first image sensor 110 and the second image sensor 120 may be disposed on the same device or different devices. The disclosure is not limited in this regard.

Detailed steps of how the system 100 performs the method for generating the disparity map would be given in the following embodiments, where the system 100 would be implemented by an image capturing device with dual lens.

Figure 2:
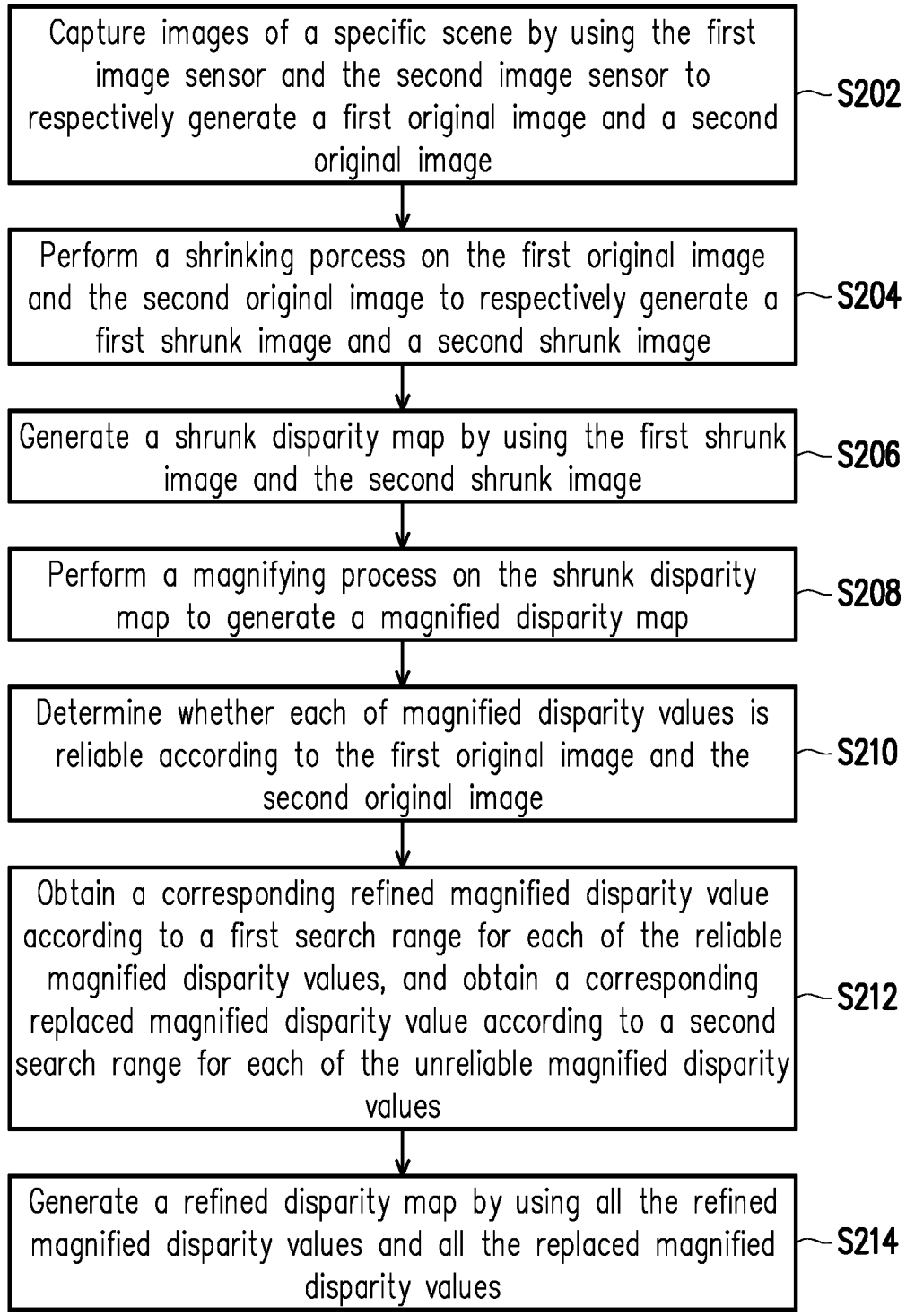
FIG. 2 is a flowchart illustrating a method for generating depth information according to an embodiment of the disclosure.

FIG. 2 is a flowchart illustrating a method for generating a disparity map according to an embodiment of the disclosure.

With reference to FIG. 1 in conjunction with FIG. 2, the processor 140 would capture images of a specific scene by using the first image sensor 110 and the second image sensor 120 to respectively generate a first original image and a second original image (Step S202). In detail, the first original image and the second original image may be two images captured from the same scene in different viewing angles respectively by the first image sensor 110 and the second image sensor 120. Herein, the first image sensor 110 and the second image sensor 120 may capture the images by, for example, using the same photographing parameters. However, the disclosure is not limited in this regard.

Next, the processor 140 would perform a shrinking process on the first original image and the second original image to respectively generate a first shrunk image and a second shrunk image (Step S204). Herein, the processor 140 may perform the shrinking process on the first original image and the second original image with the same scaling ratio. For example, when a horizontal axis and a vertical axis of each of the first original image and the second original image are shrunk by 50%, the scaling ratio would be 25%. The approach used in the shrinking process may be calculating a pixel value of each of pixels in the first original image and the second original image (referred to as "a first original pixel" and "a second original pixel" hereinafter) and combining multiple pixels into one new pixel through, for example, nearest neighbor interpolation, bilinear interpolation, bicubic interpolation, area-based interpolation, so as to obtain the shrunk images (i.e., the aforementioned first shrunk image and the aforementioned second shrunk image).

Next, the processor 140 would generate a shrunk disparity map by using the first shrunk image and the second shrunk image (Step S206), where the shrunk disparity map would be generated based on the first shrunk image and would include multiple shrunk disparity pixels, and each of the shrunk disparity pixels has a shrunk disparity value. Herein, the processor 140 would perform analysis on each pixel of the first shrunk image and the second shrunk image (referred to as "first shrunk pixels" and "second shrunk pixels" hereinafter) to calculate a disparity value of each of the first shrunk pixels with respect to the second shrunk image, and thereby generate the shrunk disparity map on a basis of the first shrunk image. In another embodiment, the processor 140 may generate the shrunk disparity map on a basis of the second shrunk image. The disclosure is not limited in this regard.

Next, the processor 140 would perform a magnifying process on the shrunk disparity map to generate a magnified disparity map (Step S208). The magnified disparity map would include multiple magnified disparity pixels having magnified disparity values, where the magnified disparity values are generated according to the shrunk disparity values. The processor 140 may magnify the shrunk disparity map to the same size as the first original image and the second original image. For instance, once a horizontal axis of a vertical axis of the shrunk disparity map are magnified by 2×, the shrunk disparity values in the shrunk disparity map are also magnified by approximately 2×.

The amount of computation and time may be significantly reduced by the approach of generating the shrunk disparity map by using the first shrunk image and the shrunk image as well as magnifying the shrunk disparity map to obtain the disparity map corresponding to the first original image and the second original image. However, the difference between a scene distribution obtained from the magnified disparity and a real scene distribution would cause low accuracy in disparity since the magnified disparity values in the magnified disparity map are not calculated based on the first original image and the second original image.

Based on the above, the processor 140 would determine whether each of the magnified disparity values is reliable according to the first original image and the second original image (Step S210) so that the processor 140 would generate a refined disparity map of the first original image and the second original image according to a determination result of whether each of the magnified disparity values is reliable. In the present embodiment, such determination may be based on a similarity between corresponding pixels in the first original image and the second original image. Next, the processor 140 may obtain a corresponding refined magnified disparity value according to a first search range for each of the reliable magnified disparity values and obtain a corresponding replaced magnified disparity value according to a second search range for each of the unreliable magnified disparity values (Step S212), where the first search range is smaller than the second search range.

For instance, assume that the magnified disparity map includes one "current magnified disparity pixel" corresponding to a first current original pixel in the first original image and a second current original pixel in the second original image. The processor 140 may determine whether the first current original pixel and the second current original pixel are similar and thereby determine whether the magnified disparity value of the current magnified disparity pixel is reliable.

If the magnified disparity value of the current magnified disparity pixel is reliable, the processor 140 may more finely adjust the magnified disparity value of the current magnified disparity pixel according to the first search range. Herein, "to adjust the magnified disparity value" would mean to search for another corresponding second original pixel within a region adjacent to the second current original pixel to be an adjusted second current original pixel. For instance, the processor 140 may search for the second original pixel having a highest similarity with the first current original pixel within the first search range of the second current original pixel to be a new second current original pixel and set the disparity value between the first current original pixel and the second current original pixel as the magnified disparity value of the adjusted current magnified disparity pixel, where the first search range is set based on the scaling ratio between the shrunk disparity map and the magnified disparity map as well as the shrunk disparity value of the shrunk disparity pixel. Detailed method for setting the same will be described thoroughly in the following embodiments.

If the magnified disparity value of the magnified disparity pixel is unreliable, the processor 140 may further search for the disparity value that can directly replace the magnified disparity value of the current magnified disparity pixel according to the second search range. For instance, the processor 140 may search for the second original pixel having a highest similarity with the first current original pixel within the second search range of the second current original pixel to be the new second current original pixel, and use the disparity value between the first current original pixel and the second current original pixel as the magnified disparity value of the adjusted current magnified disparity pixel, where the second search range may be a predetermined range of the second current original pixels (e.g., 0 to 64). In other words, the second search range would no longer set based on the shrunk disparity value of the shrunk disparity pixel.

Next, the processor 140 would generate a refined disparity map by using all the refined magnified disparity values and all the replaced magnified disparity values (Step S214). As relatively compared with the magnified disparity map, the refined disparity map may resolve insufficient accuracy issue on the disparity values after the shrunk disparity map is restored back to its original size, so as to attain more efficient and accurate depth estimation for enhancing performance in subsequent stereo vision applications.

Figure 3:
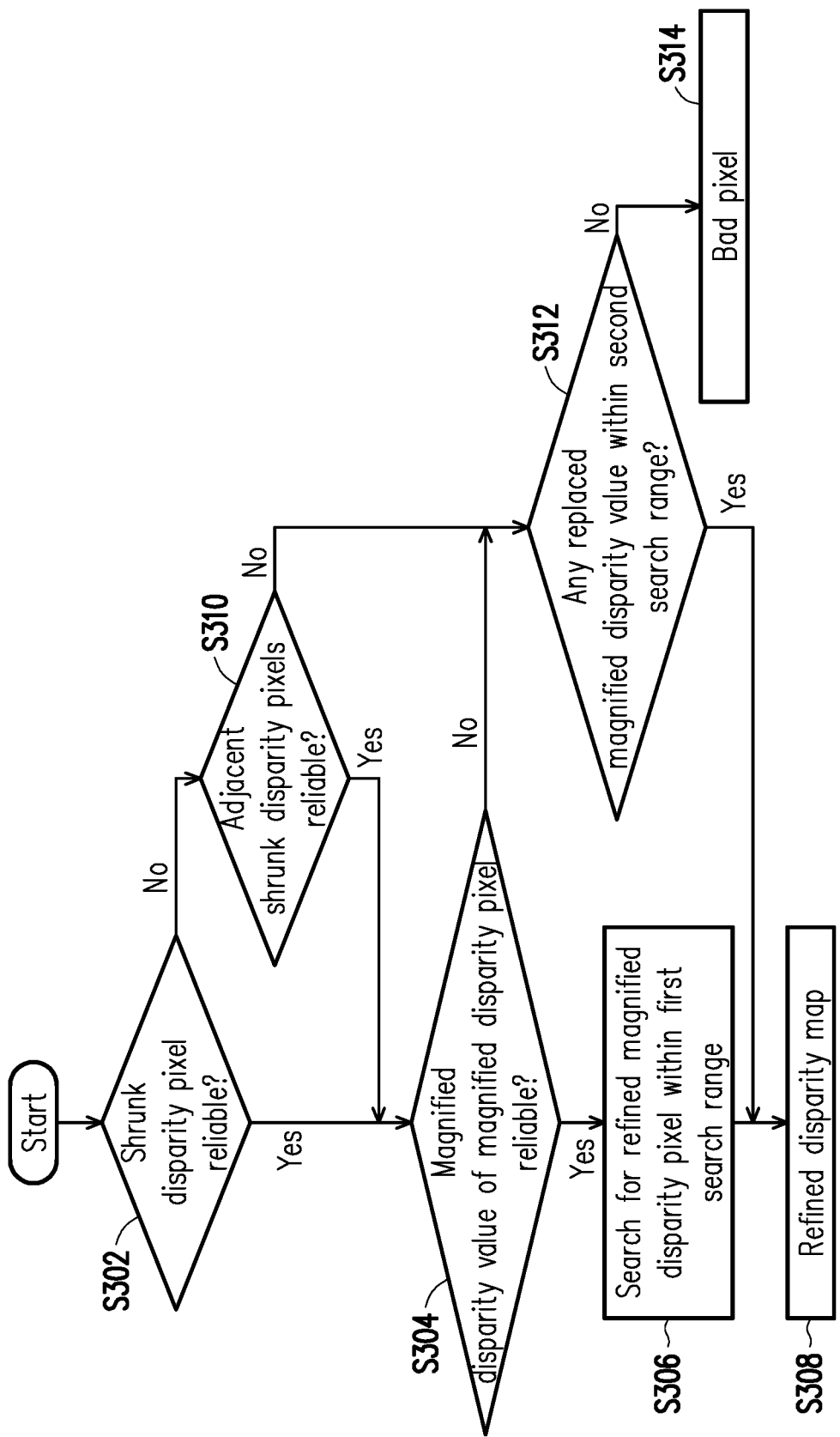
FIG. 3 is a flowchart illustrating a method for generating a disparity map according to an embodiment of the disclosure.
Figure 4A:
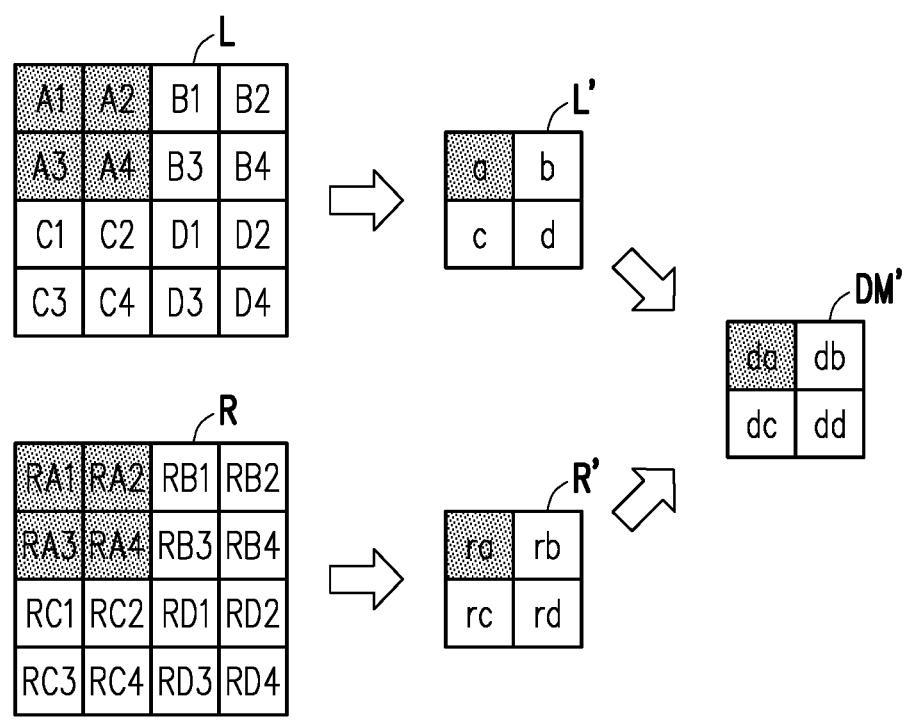
FIG. 4A to FIG. 4G are schematic diagrams illustrating the method for generating the disparity map according to an embodiment of the disclosure.
Figure 4B:
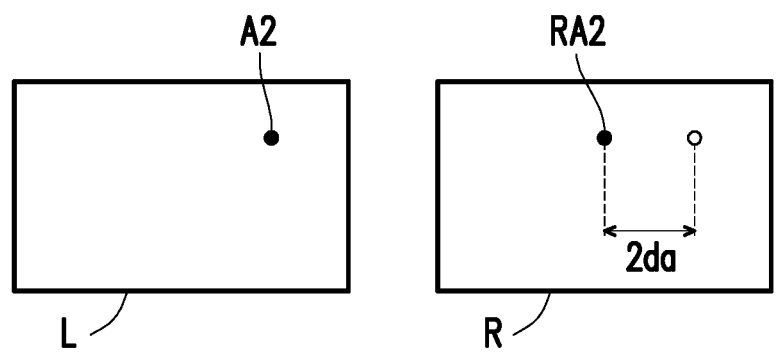
Figure 4C:
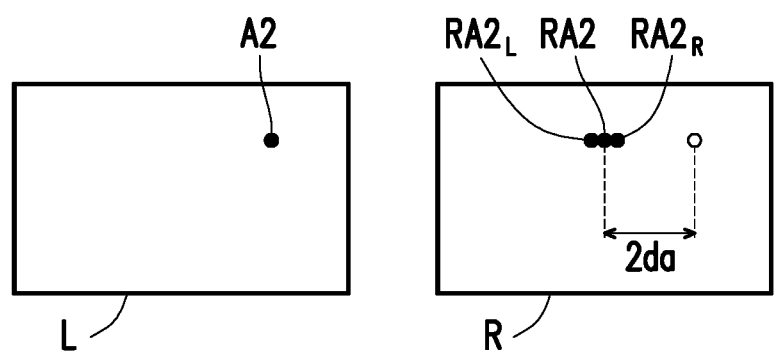
Figure 4D:
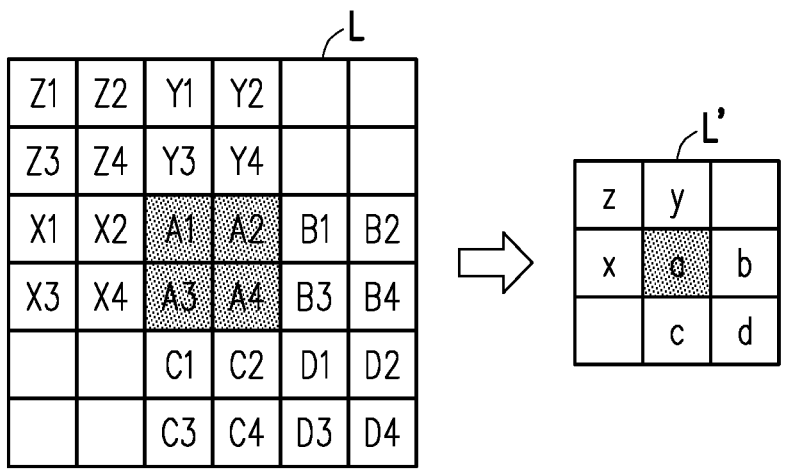
Figure 4E:
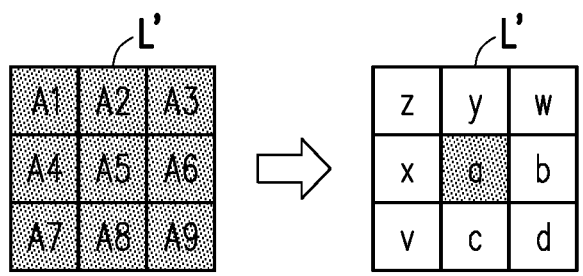
Figure 4F:
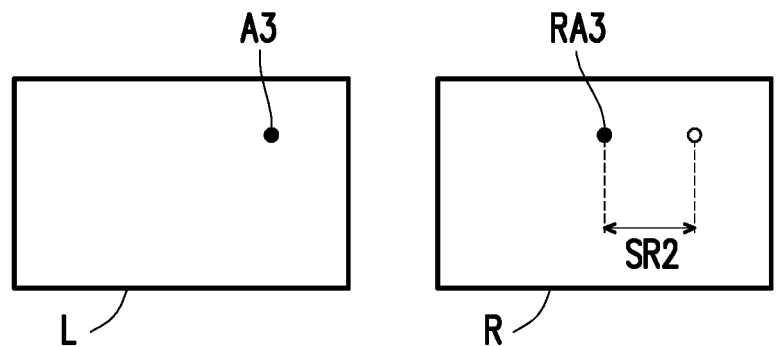
Figure 4G:
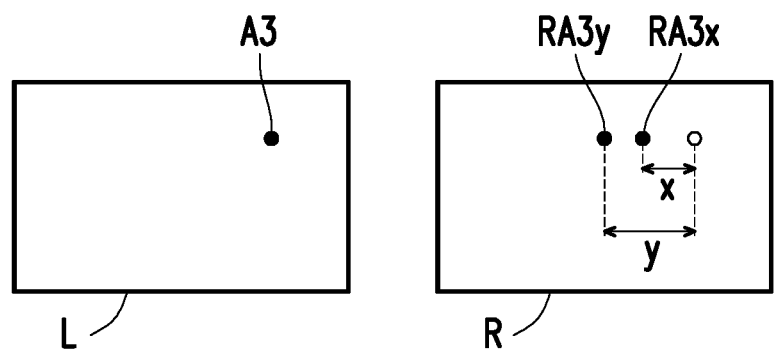

For better comprehension, implementations and details of FIG. 2 are described more specifically hereafter with reference to FIG. 3 (a flowchart illustrating a method for generating a disparity map according to an embodiment of the disclosure) and FIG. 4A and FIG. 4G (schematic diagrams illustrating the method for generating the disparity map according to an embodiment of the disclosure), where flows in the methods of FIG. 3 and FIG. 4A to FIG. 4G may also be implemented by the system 100.

Before proceeding to the flow in FIG. 3, the processor 140 is assumed to complete capturing images of a specific scene by using the first image sensor 110 and the second image sensor 120 to respectively generate a first original image and a second original image, performing a shrinking process on the first original image and the second original image to respectively generate a first shrunk image and a second shrunk image, and generating a shrunk disparity map by using the first shrunk image and the second shrunk image.

Taking FIG. 4A as an example, if a first original image L and a second original image R are both shrunk by 50% along a horizontal axis and a vertical axis, the scaling ratio would then be 25%. In other words, if the first original image L and the second original image R both have sixteen pixels, a first shrunk image L' and a second shrunk image R' would then both have four pixels. After the shrinking process is performed, four pixels A1-A4 at the upper left of the first original image L (referred to as "first original pixels A1-A4" hereinafter) would become a pixel 'a' at the upper left of the shrunk image L' (referred to as "a first shrunk pixel 'a'" hereinafter). Although the processor 140 may significantly reduce the amount of computation and timeby calculating a depth map with use of the first shrunk image L' and the second shrunk image R', disparity values da-dd in a generated shrunk disparity map DM' (referred to as "shrunk disparity values da-dd" hereinafter) are in fact disparity values calculated based on the combined first shrunk disparity pixels a-d instead of the first original pixels A1-D4. While the original pixels are combined, since the pixels at edges of different objects often affect the accuracy of disparity values, the actual disparity values of the first original pixels A1-D4 may be estimated by the flow of the method proposed in FIG. 3.

With reference to FIG. 1 and FIG. 3, after obtaining the shrunk disparity map, the processor 140 would determine whether the shrunk disparity pixels are reliable (Step S302) so as to solve the issue of combining the pixels at the edges. In the example of FIG. 4A, assume that the first original pixel A1 is a background pixel and the first original pixels A2-A4 are foreground pixels (i.e., the first original pixel A1 is an edge of a background region and the first original pixels A2-A4 are edges of a foreground region). Accordingly, a pixel value of the first shrunk pixel 'a' (referred to as "a first shrunk pixel value 'a'" hereinafter) would be closer to the foreground so that the first shrunk pixel 'a' would be regarded as a part of the foreground region. In this case, the corresponding shrunk disparity value da would be error information (i.e., unreliable) for the first original pixel A1. Thus, in this step, the approach that the processor 140 determines whether each of the shrunk disparity pixels is reliable may be first comparing a similarity between each of the first shrunk pixels and the corresponding first original pixel so as to determine whether the first shrunk pixels are reliable.

Taking the first original image L as an example, a similarity comparison would be performed on the pixel values of the first shrunk pixel 'a' with respect to the pixel values of the first original pixels A1-A4, where the pixel values may be in grayscale or color scale. For instance, an absolute value of a difference between grey scale values or the RGB values being less than 5 would indicate a high similarity. Assume that the first shrunk pixel 'a' and the first original pixels A2-A4 have high similarities. In this case, the first shrunk pixel 'a' would be reliable. In other words, the first original pixels A2-A4 before shrinking and the first shrunk pixel 'a' would correspond to the same object in a shooting scene (e.g., all of which are a foreground object). Assume that the first shrunk pixel 'a' and the first original pixel A1 do not have a high similarity. In this case, the first shrunk pixel 'a' is unreliable. In other words, the first original pixel A1 before shrinking and the first shrunk pixel 'a' would correspond to different objects in the shooting scene (e.g., the first original pixel A1 is the background and the first shrunk pixel 'a' is the foreground object).

When determining that the shrunk disparity pixel is reliable, the processor 140 would determine whether the magnified disparity value of the corresponding magnified disparity pixel in the magnified disparity map is reliable (Step S304). Herein, the processor 140 may determine whether the first shrunk pixel is reliable according to the magnified disparity value as well as a similarity between the first original pixel and the second original pixel corresponding to the magnified disparity value.

Taking the shrunk disparity value da in FIG. 4A as an example, after the processor performs the magnifying process on the shrunk disparity map DM', the corresponding magnified disparity value would be nda. Assume that the processor 140 performs the magnifying process on a horizontal axis of the shrunk disparity map DM' by a scaling ratio 2X, the magnified disparity value would then be 2da. Next, the processor 140 would search for the second original pixels in the second original image R corresponding to the first original pixels A2-A4 in the first original image L according to the magnified disparity value 2da. Taking the first original pixel A2 of the first original image L in FIG. 4B as an example, the processor 140 would obtain a corresponding second original pixel RA2 spaced by 2da in the second original image R. Next, the processor 140 would perform a similarity comparison on the pixel values of the first original pixels A2-A4 and the second original pixels RA2-RA4, where the pixel values may be in grayscale or in color scale. In the present embodiment, an absolute value of a difference between grey scale values or the RGB values being less than 5 would indicate a high similarity between the first original pixel A2 and the second original pixel RA2. In another embodiment, a bounded region the first original pixel A2 as the center (referred to as "a first region") and another bounded region with the second original pixel RA2 as the center (referred to as "a second region") would be defined. Then, a similarity between corresponding pixels in the two regions is determined. If a certain proportion of the corresponding pixels in the two regions are similar (e.g., if 70% of the corresponding pixels have an absolute value of a difference in grey scale or the RGB values being less than 5), it is determined that the first original pixel A2 and the second original pixel RA2 have a high similarity. Assume that the similarity between the first original pixel A2 and the second original pixel RA2 is high. In this case, the magnified disparity value 2da would be reliable. Assume that the similarity between the first original pixel A3 and the second original pixel RA3 is low. In this case, the magnified disparity value 2da would be unreliable.

When determining that the disparity value of the magnified disparity pixel is reliable, the processor 140 would search for a refined magnified disparity pixel within the first search range (Step S306) and accordingly construct the refined disparity map (Step S308) to obviate insufficient accuracy. As shown by Table 1, "insufficient accuracy" means the presence of a null disparity value, i.e. a disparity value not being used, when the shrunk disparity value is magnified back to the magnified disparity value (e.g., when da is magnified back to nda).

TABLE 1

| shrunk disparity value | magnified disparity value |
|---|---|
| da − 1 | 2(da − 1) = 2da − 2 |
| da | 2da |
| da + 1 | 2(da + 1) = 2da + 2 |

In the case where the scaling ratio of the horizontal axis is 2×, "2da−1" and "2da+1" would not be used if the disparity value of the first original pixel A2 is directly defined by the magnified disparity value 2da. In other words, the magnified disparity values would be spaced apart by 2 and thereby result in lower accuracy. Therefore, in this step, an accurate disparity value would be determined based on the magnified disparity value in cooperation with the adjacent null disparity values to obviate insufficient accuracy.

First, the processor 140 would set the first search range based on the scaling ratio between the shrunk disparity map and the magnified disparity map as well as the shrunk disparity value of the shrunk disparity pixel (e.g., n(da−1)<SR1<n(da+1), where SR1 is the first search range). For example, in FIG. 4B, the first search range SR1 would be 2da−2<SR1<2da+2. That is, the first search range SR1 would include three disparity values, 2da−1, 2da and 2da+1.

Next, the processor 140 would search for the second original pixel having a highest similarity with the first original pixel A2 from the second original image R within the first search range S1, where the similarity may be determined based on the pixel values in grayscale or color scale as described above. For example, in FIG. 4C, the second original pixels $RA2_R$, RA2 and $RA2_L$ have the three disparity values 2da−1, 2da and 2da+1 with respect to the first original pixel A2. The processor 140 would determine which of the second original pixels $RA2_R$, RA2 and $RA2_L$ has a highest similarity with the first original pixel A2 so as to accordingly define the refined magnified disparity value. The flow ends after the refined magnified disparity value of the first original pixel A2 is confirmed, and then the processor 140 would proceed to process the next original pixel (e.g., the first original pixel A3).

Referring back to FIG. 3, when determining that the shrunk disparity pixel is unreliable in Step S302, the processor 140 would determine whether an adjacent shrunk disparity pixel is reliable (Step S310). The processor 140 would search for the adjacent first shrunk pixel in a direction corresponding to the first shrunk pixel according to a position of the first shrunk pixel before being shrunk so as to determine whether the adjacent shrunk disparity pixel is reliable. Assume that the processor 140 takes the adjacent shrunk pixels in horizontal and vertical directions (referred to as "straight first shrunk pixels") as top priorities than the adjacent shrunk pixels in an oblique direction (referred to as "oblique first shrunk pixels") for determination.

Taking FIG. 4D as an example, assume that the similarity between the first original pixel A1 and the first shrunk pixel 'a' is low. Since the first shrunk pixel 'a' is formed by shrinking the first original pixels A1-A4 and the first original pixel A1 is located at the upper left corner, the processor 140 would first search for the first shrunk pixels adjacent to the first shrunk pixel 'a' of the first shrunk image L' in the horizontal and vertical directions (i.e., the first shrunk pixels x and y on the left and upper sides of the first shrunk pixel a) and determine whether the first original pixel A1 is similar to the first shrunk pixels x and y. If the similarity between first original pixel A1 and any one of the first shrunk pixels x and y is high, it is determined that the first original pixel adjacent to the first original pixel A1 is reliable. Therefore, the flow returns to Step S304. For instance, if the similarity between the first original pixel A1 and the first shrunk pixel x is high, the processor 140 would then determine that the first original pixel A1 and the first shrunk pixel x are substantially the same object (e.g., both of which are the background). Accordingly, information of the first shrunk pixel x (e.g., a shrunk disparity value dx of the first shrunk pixel x) may be referred to as the disparity value of the corresponding magnified disparity pixel. If the first original pixel A1 has the high similarity with both the first shrunk pixel x and the second shrunk pixel y, the one having a highest similarity with the first original pixel A1 may be regarded as the reliable first shrunk pixel.

On the other hand, if the similarity between first original pixel A1 and each of the first shrunk pixel x and the second shrunk pixel y is low, the processor 140 would search for the first shrunk pixel adjacent to the first shrunk pixel 'a' in the oblique direction (i.e., the first shrunk pixel z at the upper left) and determine whether the similarity between the first original pixel A1 and the first shrunk pixel z is high. If the similarity between first original pixel A1 and the first shrunk pixel z is high, the processor 140 would determine that the first original pixel adjacent to the first original pixel A1 is reliable, and the flow returns to step S304. If the similarity between the first original pixel A1 and the first shrunk pixel z is low, the processor 140 would determine that the adjacent first shrunk disparity pixel of the first original pixel A1 is unreliable.

As described above, the similarity comparison is performed on the first original pixel A1 with respect to the first shrunk pixel x at the left and the first shrunk pixel y at the top first. The reason that the similarity comparison is further performed on the first shrunk pixel z at the upper left when the similarities are not high is because of the continuity of pixels. The pixels adjacent in the horizontal and vertical directions are more likely to be the same object (both of which may be the same foreground object or the same background region) as compared to the adjacent pixels in the oblique direction. In addition, as shown in FIG. 4E, assume that the first original pixels A1-A9 of the first original image L are shrunk into the first shrunk pixel 'a' of the first shrunk image L' and the similarity between the first original pixel A5 at the middle of the first original image L and the first shrunk pixel 'a' is low. In this case, the first original image A5 may be compared with first shrunk pixels x, y, b and c adjacent to the first shrunk pixel 'a' in the vertical and horizontal directions without considering the first shrunk pixels z, w, d and v adjacent in the oblique direction.

On the other hand, when determining that the disparity value of the corresponding magnified disparity pixel in the magnified disparity map is unreliable in Step S304 or determining that the adjacent shrunk disparity pixel is unreliable in Step S310, the processor 140 would further determine whether the replaced magnified disparity value would be able to searched within the second search range (Step S312). As described in the embodiment of FIG. 2, the second search range may be a predetermined search range (e.g., the disparity values of 0 to 64). In other words, the setting would no longer be determined based on the shrunk disparity value of the shrunk disparity pixel, but instead, the second original pixel having a highest similarity (i.e. the replaced magnified disparity value) is searched within the second search range to construct the refined disparity map (step S308). On the other hand, when the replaced magnified disparity value could not be found within the second search range, the processor 140 would set the first original pixel as a bad pixel (Step S314). The bad pixel may be located in a region too close to the first image sensor 110 and the second image sensor 120 or in a region where one of the first image sensor 110 and the second image sensor 120 is obstructed.

For example, in FIG. 4F, assume that the processor 140 proceeds to Step S306 with the first original pixel A3 of the first original image L. In this case, the processor 140 would search for 65 corresponding second original pixels $RA3_0$ to $RA3_{64}$ in the second original image R according to a second search range SR2 (i.e., the disparity values of 0 to 64) and compare a similarity between the first original image A3 and each of the second original pixels $RA3_0$ to $RA3_{64}$. In FIG. 4G, assume that the processor 140 have found out the second original pixels $RA3_x$ and $RA3_y$ having high similarities with the first original pixel A3, and the one having a highest similarity with the first original pixel A3 would then be determined. If the first original pixel A3 and the second original pixel $RA3_x$ have a highest similarity, a disparity value x between the first original pixel A3 and the second original pixel $RA3_x$ would be the refined magnified disparity value of the magnified disparity pixel corresponding to the first original pixel A3.

On the other hand, if the first original pixel A3 does not have a high similarity with any of the second original pixels $RA3_0$ to $RA3_{64}$, the processor 140 would determine that the first original pixel A3 does not have the corresponding pixel and sets the first original pixel A3 as the bad pixel.

Taking two original images with a size of 320×180 as an example, if the disparity value of a maximum search range is 32, the number of search operations in the conventional approach for outputting one disparity map would be 320× 180×32=1843200. However, in the case of the system 100, assume that the original image is shrunk by 50% (i.e., the image size would be 160×90). The search range of the disparity value may be narrowed down to 16, and the number of search operations would then be 160×90× 16=230400. In an ideal situation, assume that the two shrunk images are restored back to the size of 320×180 with the disparity value of the maximum search range being 32. The number of additional search operations would be 320×180× 3=172800. In other words, 403200 times of search operations would be performed in total. As compared to 1843200 search operations in the conventional approach, the present embodiment is capable of saving 80% amount of the computation yet still preserving the reliability of the disparity map.

Figure 5:
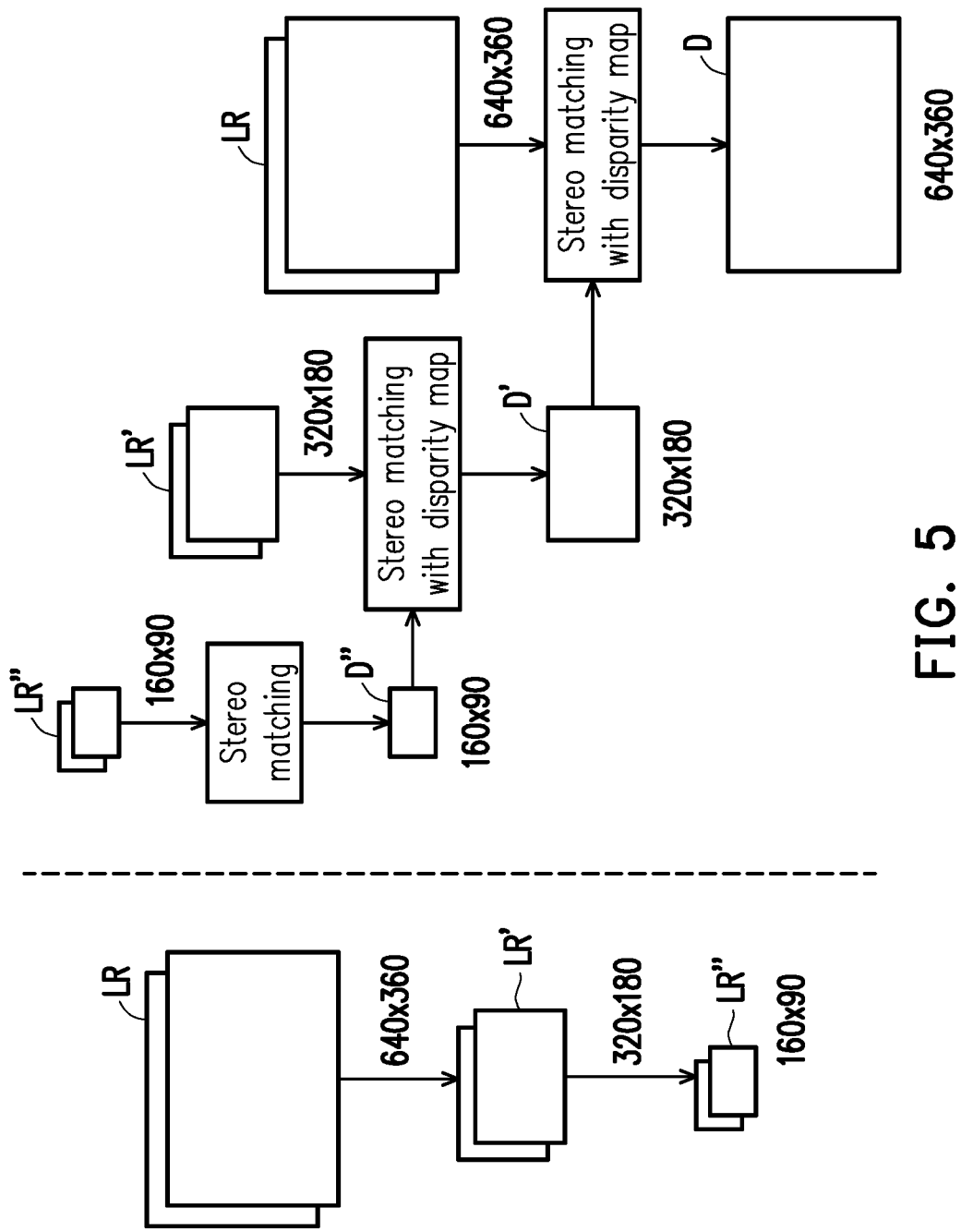
FIG. 5 is a schematic diagram illustrating a method for generating depth information according to an embodiment of the disclosure.

It should be noted that the shrinking process is performed on the original images only once in the foregoing embodiments. Nonetheless, the shrinking process may also be performed on the original image twice (or more) as shown in FIG. 5 (a schematic diagram illustrating a method for generating depth information according to an embodiment of the disclosure) and the disparity map corresponding to the original image may be obtained hierarchically. The method of FIG. 5 may also be implemented by the system 100 proposed in FIG. 1.

With reference to FIG. 1 and FIG. 5, assume that an image set LR with an image size of 640×360 is captured by the first image sensor 110 and the second image sensor 120. The processor 140 may first shrink the image set LR into an image set LR' with an image size of 320×180. Next, the processor 140 may further shrink the image set LR' into an image set LR" with an image size of 160×90.

Afterwards, the processor 140 may perform a stereo matching on the image set LR" to generate a disparity map D" with the size of 160×90. Next, the processor 140 may use the method proposed in the foregoing embodiments to generate a disparity map D' with the size of 320×180 according to the disparity map D" with the size of 160×90 and the image set LR' with the image size of 320×180 by stereo matching with assistance of the shrunk disparity map. Similarly, the processor 140 may generate a disparity map D with the size of 640×360 according to the disparity map D' with the size of 320×180 and the image set LR with the image size of 640×360 by stereo matching with assistance of the shrunk disparity map.

In summary, according to the method, the image processing device and the system for generating the disparity map proposed in the disclosure, a shrunk disparity map would be first computed by using two shrunk images, and more refined disparity values mapped from the shrunk disparity map to the two original images would then be obtained. As a result, mismatch between the shrunk disparity map and the two original images as well as low accuracy in disparity values after the shrunk depth map is restored to its original size would be obviated. The disparity map produced in the disclosure would not only resolve the problem of low system speed due to high computation on disparity estimation in stereo matching under a low-cost constraint but also increase an accuracy for depth estimation so that the effectiveness of stereo vision application such as structured light, stereo, distance detection, and surveillance would be greatly enhanced.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for generating a disparity map, applicable to a system having a first image sensor and a second image sensor, wherein the method comprises:
    capturing images of a specific scene by using the first image sensor and the second image sensor to respectively generate a first original image and a second original image;
    performing a shrinking process on the first original image and the second original image to respectively generate a first shrunk image and a second shrunk image;
    generating a shrunk disparity map by using the first shrunk image and the second shrunk image, wherein the shrunk disparity map comprises a plurality of shrunk disparity values;
    performing a magnifying process on the shrunk disparity map to generate a magnified disparity map having a plurality magnified disparity values;
    determining whether each of the magnified disparity values is reliable according to the first original image and the second original image;
    obtaining a corresponding refined magnified disparity value falling within a first search range for each of the reliable magnified disparity values, wherein the first search range is set based on a scaling ratio between the shrunk disparity map and the magnified disparity map as well as the shrunk disparity value corresponding to the reliable magnified disparity value;
    obtaining a corresponding replaced magnified disparity value falling within a second search range for each of the unreliable magnified disparity values, wherein the second search range is larger than the first search range; and
    generating a refined disparity map of the first original image and the second original image according to the refined magnified disparity values and the replaced magnified disparity values.

2. The method according to claim 1, wherein before the step of determining whether each of the magnified disparity values is reliable according to the first original image and the second original image, the method further comprises:
    for each of first shrunk pixels of the first shrunk image:
        determining whether the first shrunk pixel is reliable with respect to each of corresponding first original pixels in the first original image; and
        in response to the first shrunk pixel being determined to be unreliable with respect to a first current original pixel among the corresponding first original pixels, searching for a first adjacent shrunk pixel adjacent to the first shrunk pixel, and setting the first current original pixel to be associated with the first adjacent shrunk pixel.

3. The method according to claim 2, wherein for each of first shrunk pixels of the first shrunk image, the step of determining whether the first shrunk pixel is reliable with respect to each of the corresponding first original pixels in the first original image comprises:
    for each of the corresponding first original pixels:
        determining a similarity between the first shrunk pixel and the corresponding first original pixel, wherein the similarity is associated with a pixel value;
        in response to the first shrunk pixel and the corresponding first original pixel being determined to have a high similarity, determining that the first shrunk pixel is reliable with respect to the corresponding first original pixel; and in response to the first shrunk pixel and the corresponding first original pixel being determined not to have the high similarity, determining that the first shrunk pixel is unreliable with respect to the corresponding first original pixel.

4. The method according to claim 3, wherein for each of the corresponding first original pixels, the step of determining the similarity between the first shrunk pixel and the corresponding first original pixel comprises:

calculating an absolute value of a difference between the pixel value of the first shrunk pixel and the pixel value of the corresponding first original pixel;

determining that the first shrunk pixel and the corresponding first original pixel have the high similarity when the absolute value of the difference is greater than a first threshold; and determining that the first shrunk pixel and the corresponding first original pixel do not have the high similarity when the absolute value of the difference is not greater than the first threshold.

5. The method according to claim 2, wherein when determining that the first shrunk pixel is unreliable with respect to the first current original pixel in the corresponding first original pixels, the step of searching for the first adjacent shrunk pixel adjacent to the first shrunk pixel comprises:

determining whether the first current original pixel and at least one of other straight first shrunk pixels adjacent to the first shrunk pixels in a horizontal direction and a vertical direction have a high similarity;

when determining that the first current original pixel and said at least one of the other straight first shrunk pixels have the high similarity, setting one of the other straight first shrunk pixels having a highest similarity with the first current original pixel as the first adjacent shrunk pixel;

when determining that the first current original pixel and each of the other straight first shrunk pixels do not have the high similarity, determining whether the first current original pixel and other oblique first shrunk pixels adjacent to the first shrunk pixel in an oblique direction have a high similarity; and when determining that the first current original pixel and at least one of the other oblique first shrunk pixels have the high similarity, setting one of the other oblique first shrunk pixels having a highest similarity with the first current original pixel as the first adjacent shrunk pixel.

6. The method according to claim 5, further comprising:
when determining that the first current original pixel and each of the other oblique first shrunk pixels do not have the high similarity, obtaining the replaced magnified disparity value of the first current original pixel from the second search range.

7. The method according to claim 2, wherein the step of setting the first current original pixel to be associated with the first adjacent shrunk pixel comprises:

setting the shrunk disparity value corresponding to the first adjacent shrunk pixel as the magnified disparity value corresponding to the first current original pixel.

8. The method according to claim 1, wherein the step of determining whether each of the magnified disparity values is reliable according to the first original image and the second original image comprises:

for each of the magnified disparity values:

determining whether the magnified disparity value is reliable according to a similarity between a pixel value of the first original image and a pixel value of the second original image corresponding to the magnified disparity value.

9. The method according to claim 8, wherein for each of the magnified disparity values, the step of determining whether the magnified value is reliable according to the magnified disparity value, the pixel value of the first original image, and the pixel value of the second original image comprises:

obtaining a first current original pixel and a second current original pixel corresponding to the magnified disparity value respectively from the first original image and the second original image;

determining a similarity between the first current original pixel and the second current original pixel;

when determining that the first current original pixel and the second current original pixel have a high similarity, determining that the magnified disparity value is reliable; and when determining that the first current original pixel the second current original pixel do not have the high similarity, determining that the magnified disparity value is unreliable.

10. The method according to claim 8, wherein for each of the magnified disparity values, the step of determining whether the magnified value is reliable according to the magnified disparity value, the pixel value of the first original image, and the pixel value of the second original image comprises:

obtaining a first current original pixel and a second current original pixel corresponding to the magnified disparity value respectively from the first original image and the second original image;

setting the first current original pixel and the second current original pixel as centers to respectively obtain a first region and a second region;

determining a proportion of the first original pixels in the first region and the second original pixels in the second region having high similarities;

when the proportion exceeds a predetermined proportion threshold, determining that the magnified disparity value is reliable; and when the proportion does not exceed the predetermined proportion threshold, determining that the magnified disparity value is unreliable.

11. The method according to claim 1, wherein for each of the reliable magnified disparity values, the step of obtaining the corresponding refined magnified disparity value falling within the first search range comprises:

for each of the reliable magnified disparity values:

obtaining a first current original pixel corresponding to the magnified disparity value from the first original image; and setting the first search range according to a scaling ratio between the shrunk disparity map and the magnified disparity map as well as the shrunk disparity value corresponding to the magnified disparity value, and obtaining the corresponding refined magnified disparity value from the first search range.

12. The method according to claim 11, wherein for each of the reliable magnified disparity values, the first search range is $n(da-1) < SR1 < n(da+1)$, wherein SR1 is the first search range, n is the scaling ratio, and da is the shrunk disparity value corresponding to the magnified disparity value.

13. The method according to claim 11, wherein for each of the reliable magnified disparity values, the step of obtaining the corresponding refined magnified disparity value from the first search range comprises:
- obtaining a plurality of possible refined magnified disparity values in the first search range;
- with respect to the first current original pixel, obtaining a plurality of second possible original pixels corresponding to the possible refined magnified disparity values from the second original image;
- determining a similarity between the first current original pixel and each of the second possible original pixels; and
- setting the possible refined magnified disparity value corresponding to the second possible original pixel having a highest similarity with the first current original pixel as the refined magnified disparity value.

14. The method according to claim 1, wherein the second search range is a predetermined range and is not associated with the shrunk disparity values.

15. The method according to claim 1, wherein for each of the unreliable magnified disparity values, the step of obtaining the corresponding replaced magnified disparity value falling within the second search range comprises:
- for each of the unreliable magnified disparity values:
  - with respect to a first current original pixel corresponding to the magnified disparity value in the first original image, obtaining a plurality of second possible original pixels corresponding to a plurality of possible replaced magnified disparity values from the second original image;
  - determining a similarity between the first current original pixel and each of the second possible original pixels; and
  - setting the possible replaced magnified disparity value corresponding to the second possible original pixel having a highest similarity with the first current original pixel as the replaced magnified disparity value.

16. The method according to claim 15, further comprising:
- for each of the unreliable magnified disparity values, when determining that the first current original pixel and each of the second possible original pixels do not have a high similarity, setting the first current original pixel as a bad pixel.

17. The method according to claim 1, further comprising:
- performing the shrinking process on the first shrunk image and the second shrunk image to respectively generate a first hierarchical shrunk image and a second hierarchical shrunk image; and
- generating a refined disparity map of the first shrunk image and the second shrunk image according to the first hierarchical shrunk image and the second hierarchical shrunk image, and setting the refined disparity map as the shrunk disparity map.

18. A system for generating a disparity map, comprising:
- a first image sensor and a second image sensor, configured to capture images;
- a memory, configured to store data; and
- a processor, connected to the first image sensor, the second image sensor, and the memory, and configured to:
  - capture images of a specific scene by using the first image sensor and the second image sensor to respectively generate a first original image and a second original image;
  - perform a shrinking process on the first original image and the second original image to respectively generate a first shrunk image and a second shrunk image;
  - generate a shrunk disparity map by using the first shrunk image and the second shrunk image, wherein the shrunk disparity map comprises a plurality of shrunk disparity values;
  - perform a magnifying process on the shrunk disparity map to generate a magnified disparity map having a plurality magnified disparity values;
  - determine whether each of the magnified disparity values is reliable according to the first original image and the second original image;
  - obtain a corresponding refined magnified disparity value falling within a first search range for each of the reliable magnified disparity values, wherein the first search range is set based on a scaling ratio between the shrunk disparity map and the magnified disparity map as well as the shrunk disparity value corresponding to the reliable magnified disparity value;
  - obtain a corresponding replaced magnified disparity value falling within a second search range for each of the unreliable magnified disparity values, wherein the second search range is larger than the first search range; and
  - generate a refined disparity map of the first original image and the second original image according to the refined magnified disparity values and the replaced magnified disparity values.

19. An image processing device, comprising:
- a communication interface, configured to connect the image processing device to a first image capturing device and a second image sensor;
- a memory, configured to store data; and
- a processor, connected to the first image sensor, the second image sensor, and the memory, and configured to:
  - obtain a first original image and a second original image captured from a specific scene from the first image sensor and the second image sensor;
  - perform a shrinking process on the first original image and the second original image to respectively generate a first shrunk image and a second shrunk image;
  - generate a shrunk disparity map by using the first shrunk image and the second shrunk image, wherein the shrunk disparity map comprises a plurality of shrunk disparity values;
  - perform a magnifying process on the shrunk disparity map to generate a magnified disparity map having a plurality magnified disparity values;
  - determine whether each of the magnified disparity values is reliable according to the first original image and the second original image;
  - obtain a corresponding refined magnified disparity value falling within a first search range for each of the reliable magnified disparity values, wherein the first search range is set based on a scaling ratio between the shrunk disparity map and the magnified disparity map as well as the shrunk disparity value corresponding to the reliable magnified disparity value;
  - obtain a corresponding replaced magnified disparity value falling within a second search range for each of the unreliable magnified disparity values, wherein the second search range is larger than the first search range; and generate a refined disparity map of the first original image and the second original image according to the refined magnified disparity values and the replaced magnified disparity values.

\* \* \* \* \*